Patented Sept. 26, 1950 2,523,882

UNITED STATES PATENT OFFICE 2,523,882

INTENSIFICATION OF THE IMAGE OF DIAZO-TYPE LIGHT-SENSITIVE LAYERS

Sam Charles Slifkin, Binghamton, N. Y., assignor to General Aniline & Film Corporation, New York, N. Y., a corporation of Delaware No Drawing. Application November 10, 1945, Serial No. 627,974

7 Claims. (Cl. 95—6)

This invention relates to the production of diazotype light-sensitive layers and particularly to the improvement of the image obtained by using such light-sensitive layers.

In the duplication of originals which are transparent or semi-transparent, such as tracings or engineering drawings and typewritten documents, by the diazotype positive reproduction method, it is highly desirable that the image reproduced on the diazotype copy be one of high contrast. Accordingly, the selection of dye components for the production of the light-sensitive layer is limited to those components which will produce deep shades upon development of the image. However, such reproductions, though of high contrast and having high visual density, do not possess sufficient photographic density or opacity to actinic or ultraviolet light to render them suitable for use as intermediate prints in the further production of diazotype light-sensitive copies. It is often desirable and sometimes necessary to use a diazotype print as a master copy or intermediate for the production of such further copies, particularly where the original to be reproduced is a valuable drawing or an original design made on a delicate material which would become damaged or destroyed by frequent use in the printing process. The reproduction of opaque originals by the so-called reflex diazotype copying process also requires the use of a transparent diazotype intermediate print wherein the image developed on such transparent intermediate print is opaque to actinic light.

Diazotype light-sensitive layers have been developed for use on transparent or transparentized media which will reproduce the image in colors which have sufficient opacity to actinic or ultraviolet light to permit the reproduction of further diazotype copies or copies on other light-sensitive materials by printing through the developed diazotype print having the ultraviolet opaque image thereon. Such light-sensitive layers reproduce the image in yellow to greenish-yellow, orange or sepia shades which, though highly absorptive of actinic light and having a high degree of opacity to ultraviolet light, have the disadvantage of reproducing an image of low contrast having the inherent disadvantage of rendering inspection of the intermediate print difficult. It is, therefore, difficult, if not impossible, to detect imperfections in the intermediate print and such imperfections caused by improper exposure or development do not become visible until the final copy has been reproduced in a contrasty color.

Diazo compounds and azo components could be used in the light-sensitive layer of such transparent intermediate reproduction medium to produce colors of higher contrast, such as dark blue, maroon or black, and such methods have been tried as indicated in Patent No. 2,245,628. However, it has been found that even though good images of high contrast are obtained on the intermediate transparent diazo print, such high contrast intermediates cannot be employed successfully to make final prints on opaque sensitized paper since the colors themselves are not sufficiently opaque to actinic light.

It is an object of this invention to improve the contrast of the image produced by the dyes of light shade, the components of which are otherwise suitable for light-sensitive diazo reproduction media.

It is a further object of this invention to produce an intermediate diazo light-sensitive layer on a transparent base which will reproduce the image in a color of high contrast while preserving the good copying qualities of those colors which are highly absorptive of actinic light.

Processes have been suggested for the improvement or intensification of the image produced by diazo light-sensitive layers which will reproduce the original in an image having high opacity to ultraviolet or actinic light. Such a process is disclosed in Patent No. 2,381,984, issued August 14, 1945. In the process of this patent the color of the image is intensified by adding to the light-sensitive coating solution used in the production of the diazo light-sensitive layer salts of iodine or bromine or of hydrogen iodide or hydrogen bromide. It has now been discovered that the contrast of the reproduction obtained from light-sensitive diazotype components which will reproduce the image in an ultraviolet opaque color can be improved by the addition to the light-sensitive layers of water-soluble chromium salts. The photo-chemical characteristics of the light-sensitive layer necessary for the production of transparent intermediate diazotype prints are preserved, while intensifying the color of the image to such a degree that it has exceptional visual density. Thus, the light-sensitivity of the diazo compound necessary to the efficient production of a clear-cut image on the transparent intermediate print and the ability of the developed image to absorb actinic light necessary to the efficient development of the image on a final print are not impaired while improving the contrast of the image on the intermediate print. It has been further found that the shade of the image obtainable on the intermediate diazotype print can be varied to a considerable extent depending upon the concentration of the water-soluble chromium salt used in the coating solution. Increasing amounts of the water-soluble chromium salts give increased density or lower concentrations of the diazo compound and azo component may be used to yield the same density of color as when larger concentrations of the diazo compound and azo components are used in the absence of the chromium salt, thus increasing the effective printing speed.

Any water-soluble chromium salt may be added to the coating solution to produce this enrichment or intensification of the color shades obtainable on a transparent intermediate diazotype print, such as potassium chrome alum, chromic chloride and chromic acetate.

It has been further discovered that the intensification of the shade obtainable by the use of water-soluble salts of iodine or bromine or of hydrogen iodide or hydrogen bromide heretofore employed can be greatly improved by using one of my water-soluble chromium salts in addition to the salts of iodine, bromine, hydrogen iodide or hydrogen bromide in the coating solution. Extraordinary increases in the intensification of the color shades are thus produced. For this modification of my process, any of the intensifying compounds disclosed in U. S. Patent 2,381,984 which will provide iodide or bromide ions may be employed in combination with the soluble chromium salts. Such intensifying compounds include inorganic salts, such as alkali metal and alkaline earth metal salts of iodine and bromine, and other salts of iodine and bromine, the metal component of which is selected from group 2 of the periodic system, for instance, Mg, Ca, Zn, Sr and Ba.

These methods of intensifying the color are applicable to any diazotype reproduction medium carrying a diazo compound as the light-sensitive element on a transparent base, such as plastic films of cellulose acetate and regenerated cellulose. When the azo component is also carried in the light-sensitive layer, as in the case of the so-called two-component dry development diazotypes, it is desirable that the diazo compound be one having a slow coupling rate and hence is compatible with the azo component in the sense that it will not prematurely couple and form a dye prior to exposure and development of the light-sensitive layer. Such diazo compounds are p-diamines, particularly p-diamines of the benzene series, o- and p-aminophenols and o-diamines, wherein the undiazotized amino group is at least mono-substituted. Where a transparent base is used, as indicated above, the selection of the diazo compound and azo component should be such that the resulting dye will absorb light chiefly in the region between 3300 Å. and 4400 Å., the dyes produced therefrom being yellow to greenish-yellow, orange or sepia in shade. Suitable diazo compounds and azo components for this purpose are described in U. S. Patents 2,245,628 and 2,246,425.

The following examples are illustrative of the invention, but are not intended to in any way limit the scope thereof. The parts are by weight unless otherwise stated.

*Example 1*

A stock coating solution was prepared which contained 100 cc. of water
50 cc. of isopropanol 10 parts of tartaric acid
5 cc. of formic acid
16 parts of zinc chloride double salt of p-diazo-N-monoethyl-2-methyl aniline
1 part of saponin A cellulose acetate film was impregnated with this coating solution and dried in the usual manner. Upon placing this sensitized film in contact with an original which it was desired to copy, and exposing it to light, followed by subsequent development with gaseous ammonia, an orange tint was obtained which, due to its weakness of shade and poor contrast, was of little practical value in the production of subsequent copies.

Upon the addition of 2% of potassium chrome alum to the stock coating solution and coating the resulting solution on cellulose acetate film, drying and exposing the coated film in contact with an original to be reproduced to actinic light and then developing with gaseous ammonia, a deep brown tint was obtained. The deep brown image possessed excellent contrast and very good reproductions of the same were obtained upon subsequent use of the developed image as a transparent original on diazotype opaque reproduction paper for the production of further copies.

*Example 2*

5 parts of potassium chrome alum were added to the stock coating solution of Example 1 and a cellulose acetate film was treated in the same manner as outlined in Example 1. A deeper brown image was obtained than in the case of the 2% potassium chrome alum solution of Example 1 which possessed excellent contrast and the same high opacity to actinic light as the untreated orange coating of Example 1.

*Example 3*

5 parts potassium chrome alum and 1 part of potassium iodide were added to the stock coating solution of Example 1 and a cellulose acetate film was treated in the same manner as outlined in Example 1. An almost black image of brownish shade was obtained which possessed the same high opacity to actinic light as the untreated orange image of Example 1.

*Example 4*

2 parts of chromic chloride were added to the stock coating solution of Example 1 and a cellulose acetate film was treated in the same manner as outlined in Example 1. A deep brown image was obtained of excellent contrast and having the same high opacity to actinic light as the untreated orange coating of Example 1.

*Example 5*

5 parts of chromic chloride were added to the stock coating solution of Example 1 and a cellulose acetate film was treated in the same manner as outlined in Example 1. A deeper brown shade was obtained from this solution than from the solution containing 2 parts of chromic chloride of Example 4 which had the same characteristics of high opacity to light as the coating of Example 4.

*Example 6*

5 parts of chromic chloride and 1 part of potassium iodide were added to the stock coating solution of Example 1 and a cellulose acetate film was treated in the same manner as in Example 1. An almost black image was obtained which possessed the same high opacity to actinic light as the brown image of Example 4.

*Example 7*

2 parts of chromic acetate was added to the stock coating solution of Example 1 and a cellulose acetate film was treated in the same manner as outlined in Example 1. A deep brown shade was obtained of excellent contrast and having the same high opacity to actinic light as the untreated orange coating of Example 1.

*Example 8*

5 parts of chromic acetate were added to the stock coating solution of Example 1 and a cellulose acetate film was treated in the same manner as in Example 1. A deeper brown image was obtained from this solution than from the solution containing 2 parts chromic acetate described in Example 7 which, however, had the same characteristic of opacity to actinic light as the brown image of Example 7.

*Example 9*

5 parts of chromic acetate and 1 part of potassium iodide were added to the stock coating solution of Example 1 and a cellulose acetate film was treated in the same manner as outlined in Example 1. An almost black image was obtained having the same characteristic of opacity to actinic light as the brown image of Example 7.

When the transparent films containing the potassium chrome alum or the combination of the potassium chrome alum and the potassium iodide in the coating solutions of these examples and bearing the image of the original reproduced in the thus-intensified shades were used as positive originals to reproduce that image on other light-sensitive diazotype reproduction media by exposing the latter to light through the transparent films of said examples, excellent reproductions of the original were obtained.

It is understood that in Examples 3, 6 and 9 equivalent amounts of any of the suitable iodides and bromides disclosed in Patent No. 2,381,984 may be substituted for the potassium iodide of said examples, and that when so substituted the coating solutions will, upon exposure and development, reproduce the design of the original with the same good contrast on the transparent carrier as is obtained in the case of the potassium iodide. Also, the same results are obtained as in the case of the potassium iodide of these examples when using the intermediate transparent prints as positives for the production of a final image on a diazotype or other light-sensitive reproduction medium.

It is further understood that this process is applicable to the intensification of any color obtained by the diazotype method from diazotype light-sensitive layers on a suitable base, regardless of the subsequent use of the image produced. Thus, in addition to its application to the production of transparent copies to be used as intermediates, either in the direct copying of transparent originals or the reflex copying of opaque originals, this process can also be employed for the toning of light colored images produced on opaque copies from transparent or semi-transparent originals.

Having now particularly set forth and described my invention and having illustrated the best manner of performing it, what I claim as new is:

1. A diazotype light-sensitive material comprising on a suitable base a light-sensitive diazo compound, a water-soluble chromic salt and a water-soluble salt of the group consisting of iodine and bromine salts.

2. A diazotype light-sensitive material comprising on a suitable base a light-sensitive p-amino diazo compound of the benzene series, an azo component, a water-soluble chromic salt and a water-soluble salt selected from the group consisting of iodine and bromine salts.

3. A diazotype light-sensitive material comprising on a transparent base a light-sensitive p-amino diazo compound of the benzene series, an azo component which upon development yields a yellow to orange dye, a water-soluble chromic salt and a water-soluble salt selected from the group consisting of iodine and bromine salts.

4. A diazotype light-sensitive material comprising on a transparent base a light-sensitive p-amino diazo compound of the benzene series, an azo component which upon development yields a yellow to orange dye, potassium chrome alum and potassium iodide.

5. A diazotype light-sensitive material comprising on a transparent base a light-sensitive p-amino diazo compound of the benzene series, an azo component which upon development yields a yellow to orange dye, chromic chloride and potassium iodide.

6. A diazotype light-sensitive material comprising on a transparent base a light-sensitive p-amino diazo compound of the benzene series, an azo component which upon development yields a yellow to orange dye, chromic acetate and potassium iodide.

7. A light-sensitive layer on a cellulose acetate base comprising the $ZnCl_2$ complex of p-diazo-N-monoethyl-2-methylaniline, resorcinol, potassium chrome alum and potassium iodide.

SAM CHARLES SLIFKIN.

REFERENCES CITED

The following references are of record in the file of this patent:

UNITED STATES PATENTS

| Number | Name | Date |
|---|---|---|
| Re. 20,708 | Hinman | Apr. 26, 1938 |
| 901,218 | Triepel | Oct. 13, 1908 |
| 1,444,469 | Kogel et al. | Feb. 6, 1923 |
| 2,381,984 | Reichel | Aug. 14, 1945 |

FOREIGN PATENTS

| Number | Country | Date |
|---|---|---|
| 17,375 of 1899 | Great Britain | July 28, 1900 |
| 593,964 | Germany | Mar. 7, 1934 |
| 206,686 | Switzerland | Dec. 1, 1939 |